United States Patent [19]
Adell

[11] Patent Number: 4,741,126
[45] Date of Patent: * May 3, 1988

[54] DOOR CORNER EDGE GUARD

[75] Inventor: Robert Adell, Sunnyvale, Tex.

[73] Assignee: U.S. Product Development Company, Sunnyvale, Tex.

[*] Notice: The portion of the term of this patent subsequent to Jun. 23, 2004 has been disclaimed.

[21] Appl. No.: 64,831

[22] Filed: Jun. 22, 1987

Related U.S. Application Data

[63] Continuation-in-part of Ser. No. 840,351, Mar. 17, 1986, Pat. No. 4,674,233.

[51] Int. Cl.$^4$ .................................................. B60J 5/00
[52] U.S. Cl. .......................................... 49/462; 52/716
[58] Field of Search ................. 49/462; 52/716, 717.1, 52/718.1

[56] References Cited

U.S. PATENT DOCUMENTS

| | | | |
|---|---|---|---|
| 3,010,759 | 11/1961 | Adell | 49/462 |
| 3,187,464 | 6/1965 | Sharp | 52/716 |
| 4,548,843 | 10/1985 | Kozuka et al. | 52/716 |
| 4,674,233 | 6/1987 | Adell | 49/462 |

Primary Examiner—Kenneth J. Dorner
Assistant Examiner—Gerald A. Anderson
Attorney, Agent, or Firm—Rhodes and Boller

[57] ABSTRACT

A corner edge guard for the trailing edge of a swinging closure wherein the trailing edge is defined by surfaces which intersect at approximately 90° to form a corner. The edge guard comprises legs which are also arranged at approximately a 90° angle with the edge guard being disposed in covering a relationship to the corner. The edge guard is constructed and arranged such that concurrently with the fastening of the edge guard to the trailing edge, the distal end of the other leg forcefully bears against the other surface of the trailing edge. Preferably insulating means is disposed between the metal of the edge guard channel and the trailing edge. Various embodiments of corner edge guards are enclosed.

4 Claims, 3 Drawing Sheets

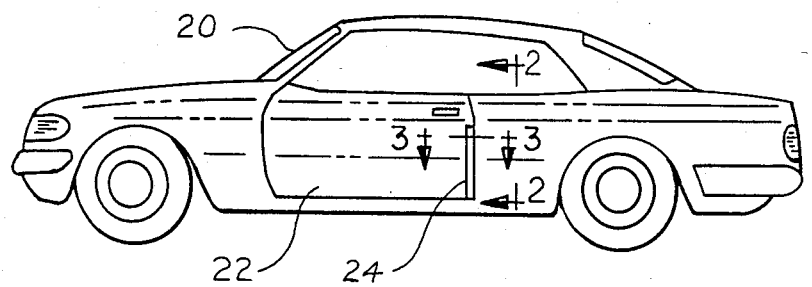
FIG. 1
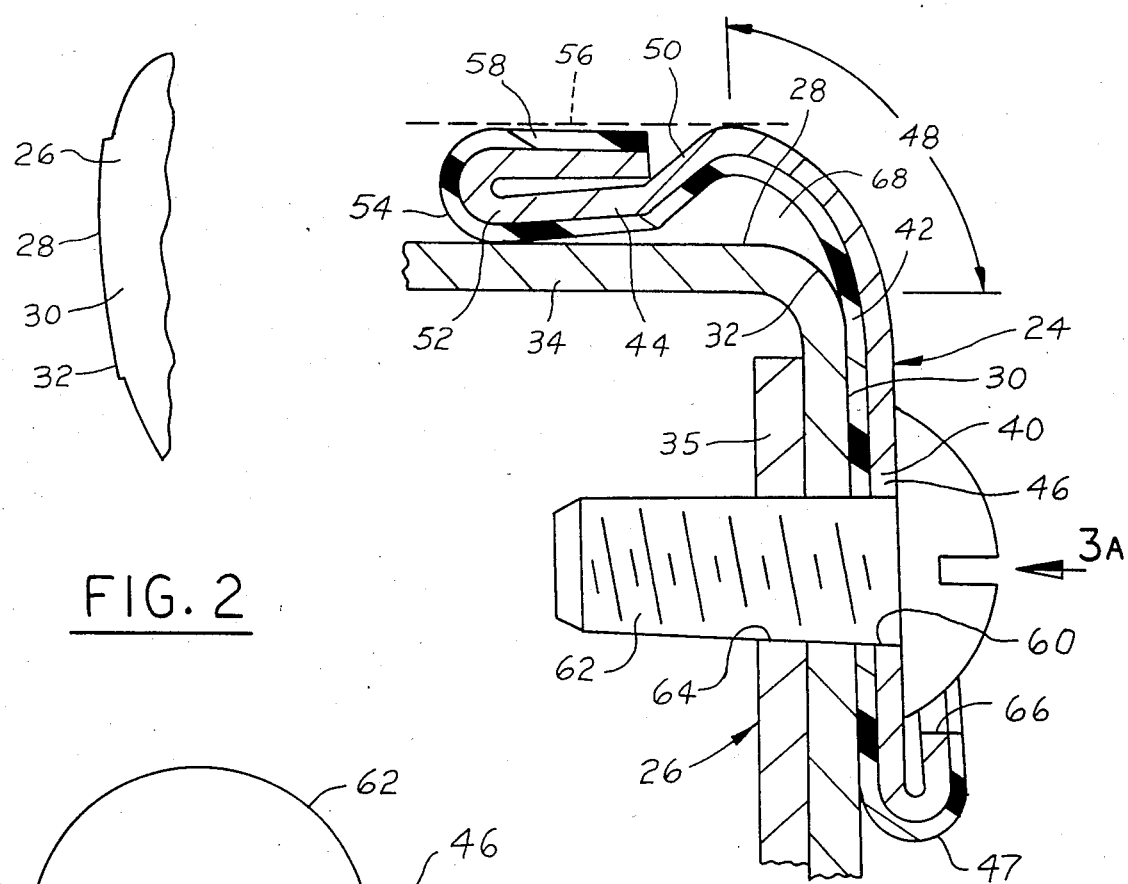
FIG. 2
FIG. 3
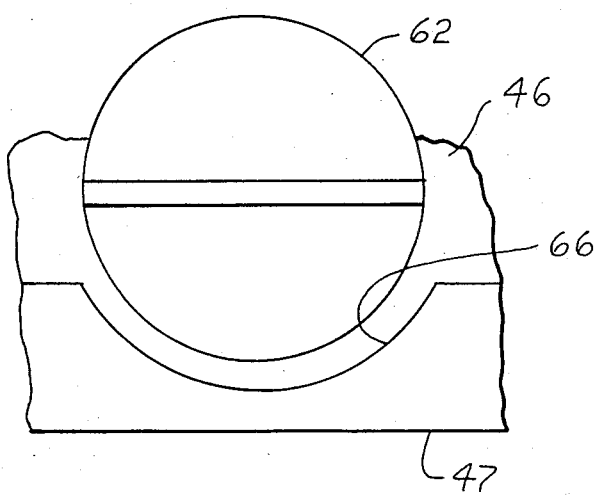
FIG. 3A

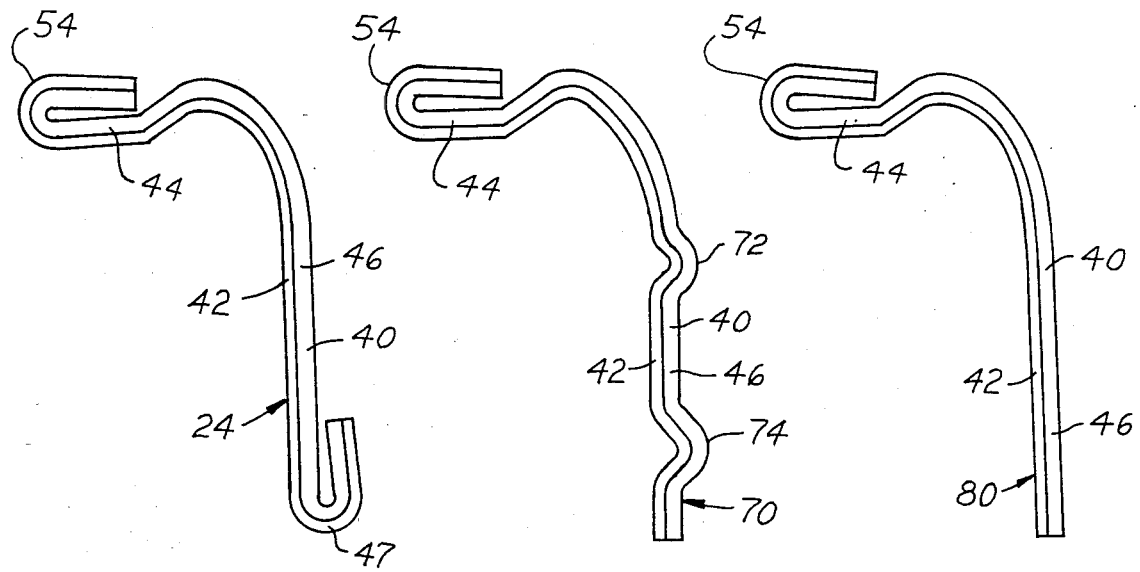
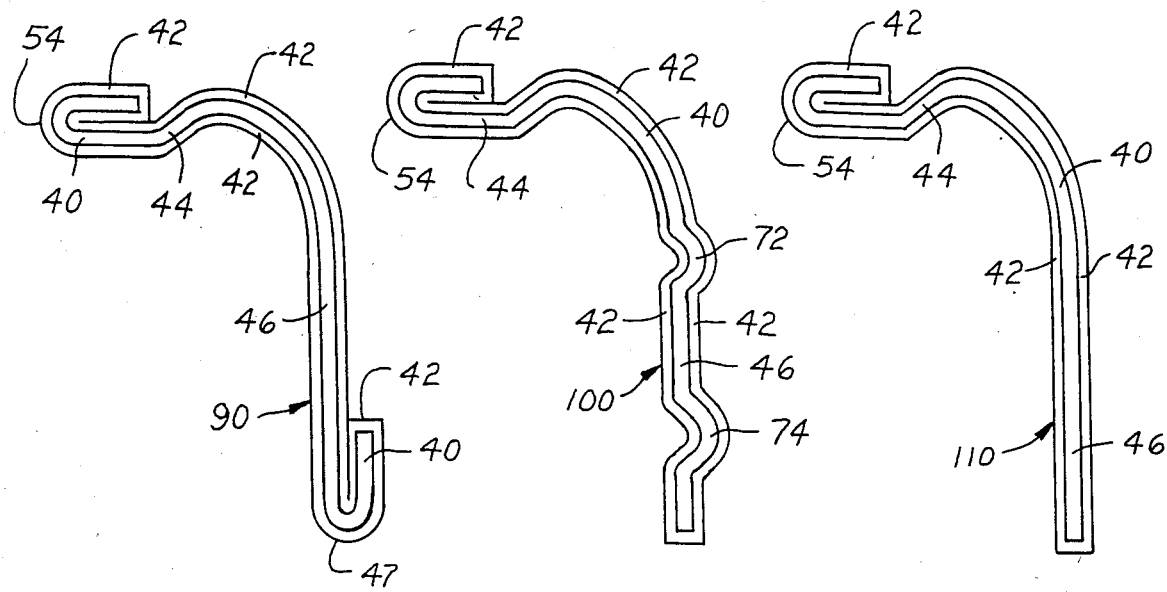

DOOR CORNER EDGE GUARD

REFERENCE TO A RELATED APPLICATION

This application is a continuation-in-part of my pending allowed application Ser. No. 840,351 filed Mar. 17, 1986, now U.S. Pat. No. 4,674,233.

BACKGROUND AND SUMMARY OF THE INVENTION

This invention relates generally to edge guards for application to the trailing edges of swinging closures such as an automobile's doors.

Reference is made to the parent application for known prior art which discloses a door edge guard which fits onto a corner of a door's trailing edge. The invention of the parent application is an improvement, particularly relating to the manner of retention on the door.

The present application discloses a further embodiment which utilizes the same generic retention principle, but with a different specific organization and arrangement of the several parts.

Reference may be had to the parent application for a detailed discussion of the improvements disclosed therein. The instant application expressly incorporates the several embodiments of the parent application and adds a new embodiment according to the best mode presently contemplated.

BRIEF DESCRIPTION OF THE DRAWINGS

FIG. 1 is a side elevational view of an automobile containing a door edge guard embodying principles of the invention.

FIG. 2 is a view taken generally in the direction of arrows 2—2 in FIG. 1, and enlarged, illustrating a view of the contour of the door edge without the door edge guard.

FIG. 3 is a view taken generally in the direction of arrows 3—3 in FIG. 1 showing the relationship of the edge guard on the door edge.

FIG. 3A is a fragmentary view in the direction of arrow 3A in FIG. 3.

FIG. 4 is an end view of the door edge guard of FIG. 3 shown by itself.

FIG. 5 is an end view of another door edge guard shown by itself.

FIG. 6 is an end view of a further door edge guard shown by itself.

FIGS. 7, 8, and 9 are end views corresponding respectively to the views of FIGS. 4, 5, and 6 but showing modified forms.

DESCRIPTION OF THE PREFERRED EMBODIMENT

Figure 10:
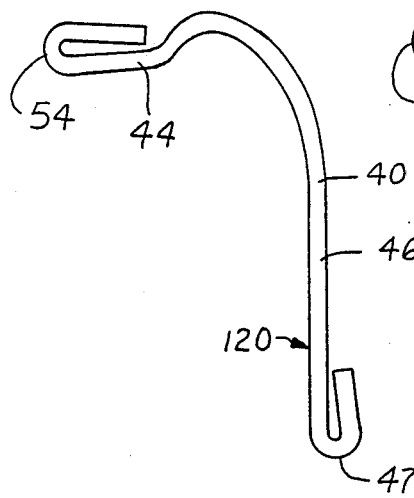
FIGS. 10, 11, and 12 are end views corresponding respectively to FIGS. 4, 5, and 6 illustrating other modified forms.

FIG. 1 illustrates an automobile 20 having a door 22 whose trailing edge contains a door corner edge guard 24 embodying principles of the invention. The shape is seen from consideration of FIGS. 1, 2, and 3, and in particular FIG. 3 shows that the door trailing edge 26 is defined in part by the exterior surface 28 of the door and the end surface 30 which is generally at a right angle to surface 28. As such, the door has an outer corner 32 defined at the juncture of the exterior surface 28 and the end surface 30. The door construction is composed of metal panel members such as 34, 35. It is the outer corner 32 of the door trailing edge 26 which the edge guard 24 of the present invention is adapted to protect.

Edge guard 24 is an elongate member which is conformed in curvature to the curvature of the corresponding portion of the door trailing edge 26 which it is intended to guard. The length of the edge guard may be substantially all or a lesser fraction of the overall length of the trailing edge.

From consideration of FIGS. 1 and 2 it can be seen that the outer corner edge 32 of the door has a compound curvature. The present invention provides a door edge guard which is adapted to fit with conformity onto this type of curvature although it may be used with other types of door edges having different curvatures. It is to be appreciated where the curvature of the door edge becomes extreme, it may be desirable to make certain modifications to the basic cross section if it is desired to have the edge guard bridge these regions of extreme change in curvature although the invention is well suited to conforming to many curvatures without any alteration of its basic cross sectional shape. These additional procedures may involve notching and bending, embossing, or other similar types of procedures.

Edge guard 24 is formed from an insulated metal strip wherein the metal is identified by the reference numeral 40 and the insulation by the reference numeral 42. Where a portion of the metal is exposed, it is preferable to use a decorative and durable material such as stainless steel for example. In other embodiments hereinafter described where the metal is not exposed, lesser grades of metal may alternatively be used. When viewed endwise or in transverse cross section, the edge guard is seen to possess a generally right angle channel shape. For explanation, the edge guard may be considered to comprise an outer leg 44 which is disposed against the exterior door surface 28 and a back leg 46 which is disposed against the end surface 30. The leg 46 is shown to be essentially straight and flat. A bead 47 is formed at the distal end of leg 46 by reverse turning the insulated metal strip outwardly back against itself in the manner shown. Preferably the degree of reverse turning is such that metal-to-metal contact results.

The two legs 44, 46 merge in a curved bend section 48 which may be considered to have approximately a 90° curvature as depicted in FIG. 4. The outer leg 44 extends from this section 48 in a forward direction. It comprises an inwardly curved offset section 50 extending from section 48. From the offset section 50, the leg extends in a straighter section 52 and the distal end is provided with a bead 54 by reverse turning the margin of the insulated metal strip outwardly back against itself, preferably so that metal-to-metal contact results in a similar manner to the formation of bead 47 in leg 46. The extent of the offset section 50 in relation to the rest of leg 44 is such that the exterior of bead 54 is generally flush with the point where the curved bend section 50 merges with section 48. This is exemplified by the broken line 56.

The layer of insulating material 42 is applied to one side of the metal strip 40 from which the edge guard is formed. This may be done in accordance with procedures which are the subjects of other of applicant's inventions. As such the layer may be formed by extrusion, lamination or other procedures, by way of example.

From consideration of FIG. 3 it can be seen that the non-metallic insulating material is disposed between the edge guard metal 40 from the painted metal of door 22.

Moreover, the formation of bead 54 by reverse turning the margin of the strip results in a portion of the insulating material being disposed on the exterior of the door. This presents the appearance of a band designated by the reference numeral 58. By making this band of a desired color, various color coordination schemes may result. Alternatively the insulation could be made of a metallic color closely matching the metal 40.

The corner edge guard has no self-retention capability by itself on door 22. Accordingly separate fasteners are used to make the attachment. For this purpose holes 60 are provided in leg 46 at intervals along the length of the door guard and fasteners such as headed screws 62 are passed through holes 60 and into corresponding aligned holes 64 in the end of the door. The screws can be of the self-tapping type and so sized that they clear holes 60 while cutting threads into the holes 64 as they are being installed. Where a bead such as the bead 47 might interfere with a flush fit of the screw heads against the back leg, the bead may be notched as at 66 to yield clearance for the screw heads in the manner shown. Whether notching is appropriate will depend upon each particular usage and upon the size of the screw head and the dimensions of the door edge guard's back leg.

By making leg 46 flat, it is rendered well-suited for being pressed flat against the end surface 30 of the door edge as the screws 62 are tightened with the insulating layer being conformed in between. Because there may be metal-to-metal contact between the heads of the screws and the metal 40, and because the screws shanks thread into the metal of the door, there can be continuity between the metal of the door edge guard and the door itself via the screws. By the flat mounting, and by making the metals of similar characteristics, i.e. both steel, the development of undesired detrimental effects such as corrosion is more or less inhibited even though there is metal-to-metal continuity through the fasteners. As will be seen, further inhibition of detrimental effects can be alleviated by some of the other embodiments hereinafter disclosed. Alternatively the use of non-metallic fasteners could be employed in some applications.

The edge guard is so dimensioned in its cross section that when it is installed on the corner edge the beaded end 54 of the outer leg 44 will be urged to forcefully bear against the exterior surface. This is done by a suitable dimensioning of the hole 64 from the exterior surface 28 in relation to the location of holes 60, 64 relative to leg 44. Hence as the back leg 46 is being urged flat against the end surface 30 of the edge, the fastening action is also effective to cause the beaded distal end of the outer leg to forcefully bear against the exterior surface 28. In this way the edge guard is conformed to the trailing edge at the corners where the contour of the corner edge is straight, has simple curvature, or even has compound curvature.

The construction of the sections 48 and 50 serves to provide strength to the edge guard and it also provides a space 68 between the door and the edge guard through which any moisture which might collect in the space can drain. The strengthening is well adapted to protect the corner edge of the door from impact.

FIG. 5 shows another embodiment of edge guard 70. The shape of edge guard 70 is exactly like edge guard 24 of FIG. 4 except in two respects. First, it includes two parallel ridges 72, 74 which are formed in leg 46. The ridges are deformed outwardly away from end surface 30 so that the back leg 46 can still be disposed flat against the end surface 30 when the edge guard is installed on the trailing edge. Embodiment 70 also differs in that bead 47 is omitted. While bead 47 provides a certain amount of stiffening to the leg which is useful in certain instances, the ridges 72, 74 also impart a certain stiffening such that the bead 47 can be omitted. If there is interference between ridges 72, 74 and the head of the screws used to fasten the edge guard to the door edge, such interference may not be objectionable. However the beads could be flattened locally where the screw heads bear against the leg or there could be notching in a matter analogous to that described for the bead 47 in FIG. 3. The use of like reference numerals in FIG. 5, as well as the ensuing drawing figures is intended to represent like parts, previously described in connection with FIGS. 1-4.

FIG. 6 illustrates a still further embodiment 80 which is exactly like the embodiment 2 of FIG. 4 except that the bead 47 is omitted. Although not shown in the drawings, there could be additional embodiments wherein the use of bead 47 is combined with one or both of the ridges 72, 74.

FIGS. 7, 8, and 9 portray respective embodiments 90, 100, and 110 which are exactly like the embodiments of FIGS. 4, 5, and 6 except that the entire cross section of the metal 40 is covered with a layer of insulating material 42. Such a layer can be provided by extruding plastic material onto the metal strip 40 in the flat before it is formed to the illustrated cross section. Both the major surfaces of the strip as well as the side edge surfaces are covered with insulation. The insulating material will present the exterior color and by use of selected colors, various color coordinations with the automobile may be obtained. In these embodiments 90, 100, 110 it is to be observed that the heads of the screws will bear against insulating material rather than the outer surface of the metal channel. This further tends to inhibit rust and corrosion where there are dissimilar metals involved. Because of the use of plastic to fully encapsulate the cross section, a lower grade of metal can be used. In any of the embodiments where the edge guard is cut to length, the ends of the edge guard may have exposed metal. In the embodiment shown in FIG. 7, it may be deemed desirable to cover the cut ends and this can be done by paint, plastic, or the like applied to the ends.

The embodiment 100 of FIG. 8 is exactly like the embodiment 70 except that insulation is applied to the full extent of the cross section as shown. Likewise the embodiment 110 of FIG. 9 is exactly like embodiment 80 of FIG. 6 except that the full cross section is covered by insulating material.

Figure 11:
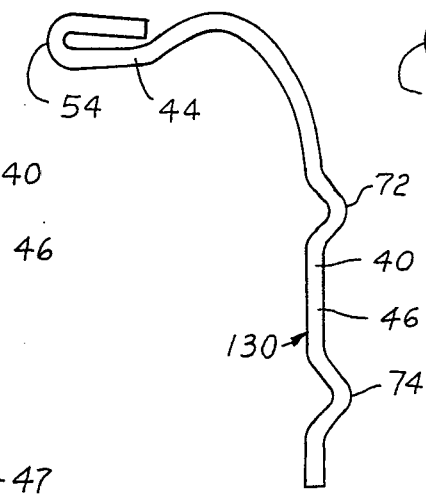
Figure 12:
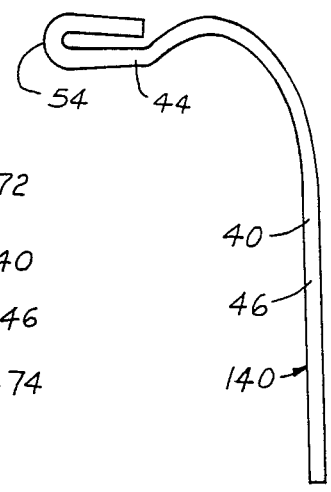

FIGS. 10, 11, and 12 portray embodiments 120, 130, 140 consisting solely of metal. While these embodiments are deemed less desirable because they do not possess the insulating features characteristic of the other embodiments, they do reflect the basic metal edge guard construction and each of the embodiments 120, 130, 140 is like the embodiments 24, 70, and 80 except that insulating material is omitted.

Figure 13:
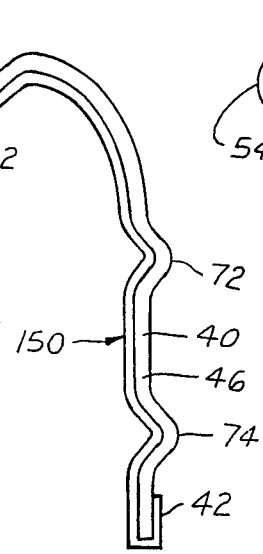
FIG. 13 is an end view illustrating a further embodiment of edge guard.
Figure 14:
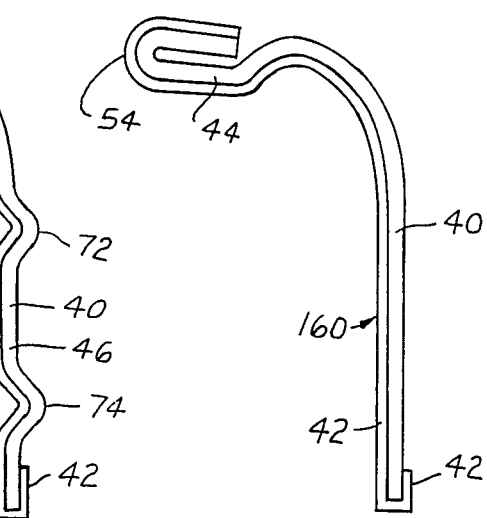
FIG. 14 is an end view illustrating still another embodiment of edge guard.

FIG. 13 portrays an embodiment 150 similar to FIG. 5 but where insulation has been extended around the end edge surface of the metal strip where the bead 47 has been removed. This type of construction is possible using the aforementioned manufacturing technique of extruding the plastic onto the metal in the flat. Likewise the embodiment 160 of FIG. 14 is like the embodiment of FIG. 6 but including insulation extending around the distal end edge of the base leg where the bead 47 has been omitted.

In all embodiments the edge guard possesses the ability to be conformed to compound curvatures while still causing the distal end of the outer leg to forcefully bear against the exterior surface while the back leg bears flat against the end surface. The embodiments which illustrate the particular shape for the sections 48 and 50 and for the outer leg are also advantageous because of the strength characteristic which they possess. It is to be appreciated that in the drawing figures the relative proportions may not necessarily be to scale or represent exact proportions since they are intended to be illustrative to principles of the invention. While PVC (polyvinylchloride) is a suitable material for the insulation 42, other insulating material may be used.

Figure 15:
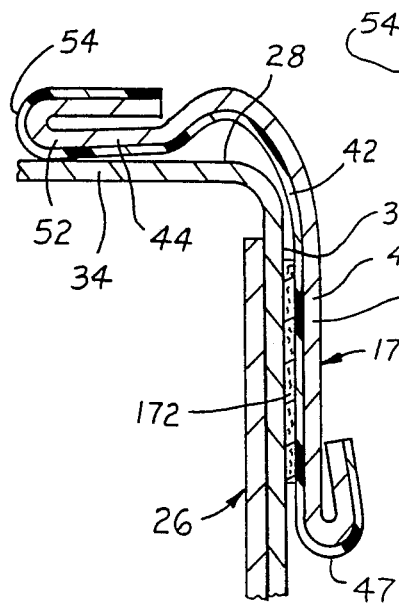
FIG. 15 is a view similar to FIG. 3 but on a reduced scale of another embodiment of the invention.

In FIG. 15 like reference numerals designate like parts as in FIG. 3. The edge guard however is identified by the general reference numeral 170. Edge guard 170 has essentially the same transverse cross sectional shape as edge guard 24 of FIG. 3. While the same generic retention principle is used, the particular means by which this principle is implemented are slightly different. Instead of fabricating the edge guard with holes 60, of providing the door with holes 64, of using screws 62 and of providing clearance notches 66 for the heads of the screws, the door is left free of holes and the edge guard is of uniform transverse section at any location along its length.

A thin double-backed adhesive tape 172 is disposed at a central region of the inner surface of the edge guard's back leg 46 and extends along the length of the back leg either continuously as a single length or as several pieces along the length. Any of the conventional commercially available tapes may be used. The particular tape selected will take into account the particular type of paint on the door and the type of material on the inner surface of the back leg of the edge guard. The tape is comparatively thin and therefore can effectively serve to minimize the overall thickness of the door guard and fastening means which will exist between the end surface 30 of the door and the adjacent door pillar when the door is closed. This is a desirable attribute. The use of such tape eliminates extra parts such as the fasteners; also the need for putting holes into the door and notches in the edge guard, such as 66 in FIG. 3.

Yet, the same retention principle exists because the size, shape and retention strength of the double-backed tape prevents the edge guard from an appreciable outward shifting which would result in loss of the forceful engagement of the distal end of outer leg 44 against the exterior surface 28 of the door.

Assembly of door corner edge guard 170 to the door is achieved by positioning the guard in such a manner at assembly that the outer leg's distal end is caused to bear forcefully against the exterior surface of the door while the back leg which contains the double-backed tape is pressed against the end surface 30 of the door. Preferably, the door corner edge guard is sold with one surface of the double-backed tape adhered to the back leg of the guard and with the other surface covered by release paper. In this way it is assured that the tape is in the best location for the particular model involved. At time of installation, the release paper is stripped to expose the adhesive, and the guard is applied to the door in the manner described.

What is claimed is:

1. In combination with the trailing edge of a swinging closure of an automobile wherein the trailing edge is defined by surfaces which intersect at approximately 90 degrees to form a corner, one of said surfaces being an exterior surface of the automobile which is visible when the swinging closure is in closed position and the other surface being an end surface, a decorative and protective corner edge guard for protecting said corner comprising an elongate metal channel protectively fitting over at least a portion of the length of said corner and having an outer leg disposed against said exterior surface and a back leg disposed against said end surface, fastening means disposed between said back leg and said end surface for holding said back leg against said end surface such that as viewed in transverse cross section said fastening means is located at a central region of said back leg, and said corner edge guard being constructed and arranged such that concurrently with the action of said fastening means in holding said back leg against said end surface, the distal end of said outer leg is also forcefully urged against said exterior surface by the distance from the location of action of said fastening means on said end surface to said exterior surface relative to the distance from the location of action of said fastening means on said back leg to the distal end of the outer leg, said fastening means being constructed and arranged to have a manner of attachment to said back leg and to said end surface to preclude any appreciable shifting of said back leg on said end surface which would result in the distal end of said outer leg losing forceful engagement with said exterior surface.

2. A decorative and protective corner edge guard as set forth in claim 1 in which said fastening means comprises a strip of double-backed adhesive tape disposed between said end surface and the surface of said back leg which confronts said end surface.

3. A decorative and protective corner edge guard as set forth in claim 2 in which said back leg has a uniform transverse cross section throughout the length of the corner edge guard.

4. A decorative and protective corner edge guard as set forth in claim 3 in which said back leg is free of holes.

* * * * *